US007603699B2

(12) United States Patent
Abdulhayoglu

(10) Patent No.: US 7,603,699 B2
(45) Date of Patent: Oct. 13, 2009

(54) METHOD FOR ESTABLISHING TRUST ONLINE

(76) Inventor: Melih Abdulhayoglu, 525 Washington Blvd., Suite 2010, Jersey City, NJ (US) 07310

( * ) Notice: Subject to any disclaimer, the term of this patent is extended or adjusted under 35 U.S.C. 154(b) by 183 days.

(21) Appl. No.: 11/467,461

(22) Filed: Aug. 25, 2006

(65) Prior Publication Data
US 2007/0061734 A1    Mar. 15, 2007

Related U.S. Application Data

(60) Provisional application No. 60/711,256, filed on Aug. 25, 2005.

(51) Int. Cl.
*H04L 9/00* (2006.01)
(52) U.S. Cl. ............... 726/2; 726/1; 726/3; 726/4; 713/155; 713/156; 713/168; 713/175; 713/176; 705/18; 705/50; 705/57; 705/76; 715/200; 715/738; 715/742; 345/24
(58) Field of Classification Search ......... 713/175, 713/176, 156; 726/2, 3, 1, 4; 715/200, 204, 715/246, 273, 517, 742, 781; 345/24, 418, 345/742
See application file for complete search history.

(56) References Cited

U.S. PATENT DOCUMENTS

| 6,812,938 | B2 * | 11/2004 | Pinnell ............... 715/741 |
| 6,968,455 | B2 * | 11/2005 | Okayasu et al. ......... 713/176 |
| 6,973,627 | B1 * | 12/2005 | Appling ............... 715/781 |
| 7,114,177 | B2 * | 9/2006 | Rosenberg et al. ......... 726/4 |
| 7,216,291 | B2 * | 5/2007 | Kim ............... 715/227 |
| 2003/0023878 | A1 * | 1/2003 | Rosenberg et al. ......... 713/201 |
| 2004/0030784 | A1 * | 2/2004 | Abdulhayoglu ......... 709/227 |
| 2004/0078564 | A1 * | 4/2004 | Abdulhayoglu ......... 713/156 |
| 2005/0268100 | A1 * | 12/2005 | Gasparini et al. ......... 713/170 |
| 2006/0085741 | A1 * | 4/2006 | Weiner et al. ......... 715/517 |

OTHER PUBLICATIONS

Anna Belle Leiserson, A User's Perspective on Privacy and the Web, pp. 539-546, 2002.*
Jothy Rosenberg, GeoTrust True Site, White Paper, pp. 1-12, Nov. 2001.*
Jothy Rosenberg, GeoTrust QuickSSL, White Paper, pp. 1-13, Dec. 2001.*
Tie-Yan Li et al, Trust on Web Browser: Attack vs. Deffense, pp. 241-253, Springer-Verlag, 2003.*
Tie-Yan Li et al, Trust on Web Browser: Attack vs Defense, pp. 141-253, Springer-Verlag, 2003.*
Static Pictures- Dynamic Drive Forums, www.dynamicdrive.com, pp. 1-4, 2005.*
Godwin J Udo et al, Effective Commercial Web Site Design: An Emphirical Study, pp. 331-318, IEEE 2000.*

* cited by examiner

*Primary Examiner*—Nasser G Moazzami
*Assistant Examiner*—Shanto M Abedin
(74) *Attorney, Agent, or Firm*—Richard J Rowley

(57) ABSTRACT

A method and system for displaying the trusted status of a website by displaying a trust symbol that is displayed as part of the website so that they trust symbol does not scroll when the website is scrolled, preventing the trust symbol from ever being hidden from the user. Specifically, displaying the trust symbol in the comer or bottom of the web page works well. The trust symbol can include information about the website that may be displayed when the computer user interacts with the trust symbol. Both the trust symbol and the information displayed about the website can be generated dynamically by the third party validator for display on website. However the location of the display of the trust symbol remains under the control of the website operator so as not to interfere with the aesthetics of the site.

10 Claims, 5 Drawing Sheets

METHOD FOR ESTABLISHING TRUST ONLINE

CROSS REFERENCE TO RELATED APPLICATIONS

This application is related to and claims reference to application Ser. No. 60/711,256, filed Aug. 25, 2005, entitled "METHOD FOR ESTABLISHING TRUST ONLINE", by Melih Abdulhayoglu.

BACKGROUND

With the rapid deployment of electronic commerce and communications globally, the security of electronic transactions and records has become a pivotal concern. With the proliferation of phishing, pharming and other fraudulent acts over the Internet, it has become more and more difficult to verify the authenticity of a party to an e-commerce transaction.

Phishing and pharming are acts of attempting to fraudulently acquire sensitive information, such as passwords, account information and credit card details, by masquerading as a trustworthy person or business with a real need for such information. In phishing, a fraudster sends an email to a user, requesting that the user click on a link in the email that directs the user to enter sensitive information on the ensuing web site. Because the links and web sites are usually near exact copies of valid websites of well-known companies, such as large banks or eBay, the user is fooled into thinking the websites are legitimate and hence secure. Estimated losses from phishing now ranges in the billions of dollars.

Pharming refers to the redirection of an individual to an illegitimate web site through technical means. Pharming is the exploitation of a vulnerability in the DNS server software that allows a hacker to acquire the Domain Name for a site, and to redirect traffic to that website to another website. DNS servers are the giant computers that "run" the Internet. For example, an Internet banking customer, who routinely logs in to his online banking Web site, may be redirected to an illegitimate Web instead of accessing his or her bank's Web site. Pharming can occur in four different ways: (1) Static domain name spoofing where the "pharmer" attempts to take advantage of slight misspellings in domain names to trick users into inadvertently visiting the pharmer's Web site; (2) Malicious software where viruses and "trojans" (latent malicious code or devices that secretly capture data) on a consumer's personal computer may intercept the user's request to visit a particular site and redirect the user to the site that the pharmer has set up; (3) domain hijacking, where a hacker may steal or hijack a company's legitimate Web site via domain slamming or domain expiration, allowing the hacker to redirect all legitimate Internet traffic to an illegitimate site; and (4) DNS poisoning, one of the most dangerous instances of pharming. Local DNS servers can be "poisoned" to send users to a Web site other than the one that was requested. This poisoning can occur as a result of misconfiguration, network vulnerabilities or Malware installed on the server.

Both phishing and pharming lead unsuspecting customers to give up valuable personal and financial information. U.S. companies lose more than $2 billion annually as their clients fall victim. The methods for preventing phishing and pharming attacks include client-side, server-side, and enterprise level measures.

On the client-side, current methods for eliminating phishing and the risks posed by phishing include desktop protection measures, email controls, browser controls, and general end user vigilance. Desktop protection measures include typical anti-virus software, firewalls, spam filters, and spyware detection. While these methods are useful in protecting users from certain phishing risks, they can be expensive, require monthly subscriptions and software updates, and can be complex and difficult to manage. Controlling a user's email, such as blocking attachments, de-activating HTML, and scanning for spam and viruses can be useful since most phishing attacks come through spam and email. Email can also be digitally signed to verify the integrity and authenticity of email messages. However, email controls have limited success, do not block other sources of phishing or pharming, obfuscate the readability of HTML-based emails, may not support S/MIME digital signatures on certain types of web-based email systems, and may not be useful to users for checking certificate revocation status. Browser controls may also be manipulated to disable pop-ups, ActiveX, Java, and other scripts and cookies. These methods, however, decrease the browser's functionality and are not easy for consumers to understand or implement. Finally, improving customer awareness can be used to educate users about phishing attacks and how to avoid them. Unfortunately, this results in information overload while at the same time phisher develop new fraudulent techniqes to confuse end users.

On the server-side, protection against phishing can be afforded by custom web application security. A key security concern revolves around increasingly sophisticated cross-site scripting vulnerabilities. These cross-site scripting vulnerabilities often escape other client-side protection strategies due to inherent trust relationships between the customer and the website owner, resulting in highly successful, and undetectable, attacks. Custom web application security can be implemented by safe session handling, qualifying URL links, providing multiple methods of customer authentication, and image regulation. While these methods are robust, they require skilled developers, must be subjected to extensive testing, and require significant overhead and processing resources.

On the enterprise level, methods for protecting against phishing include mail server authentication, such as sending email over an encrypted SSL/TLS link through the use of Secure SMTP. This method, though, is still spoofable, does not allow for email forwarding processes, and is not common. Domain monitoring can also be used, but requires corporate vigilance and monitoring of its domain names, and similar names.

Finally, other methods for ensuring the authenticity and integrity of websites include the use of SSL certificates to create encrypted sessions. When a website owner uses an SSL certificate with a website, the browser displays a padlock or other security symbol in one of its toolbars. The toolbar represents that an encrypted session is established. By clicking on the padlock, the user can access information relating to the authenticity of the website. This information can be useful, but it is often difficult for a consumer to understand. Furthermore, the display of the padlock is controlled by the browser, and may not be noticed by a user.

In other methods, the user downloads an anti-phishing toolbar that displays authenticity and security information, such as what domain is authenticated by any associated digital certificates. This method, however, requires a user to download the toolbar application, which consumers may be reluctant to do since there are myriads of toolbar downloads that contain spy-ware or ad-ware.

Finally, a website owner may attach a site-seal to the website, showing that the site has been authenticated. While some site-seals provide security and assurance information when double-clicked or moused-over, the site seals usually are not very conspicuous, and usually must be placed at the bottom of a web page where there is white space. Thus, a user may not see the site-seal unless he or she scrolls to the bottom of the page.

Many other methods for guarding against phishing and pharming are described in detail in the publication: *The Phishing Guide: Understanding & Preventing Phishing Attacks*, written by Gunter Ollmann and published by NGS-NISR (Next Generation Security Software Ltd.) in September, 2004, the contents of which are incorporated herein by reference in its entirety.

SUMMARY

In one of many possible embodiments, the present invention provides a method for establishing trust online by displaying a trust symbol on a web page; wherein the trust symbol is configured to display security and assurance related information. In one embodiment, the trust symbol is static on a web page, and it may be located in a corner of a web page, among other places.

In another embodiment, the present invention provides a system for establishing trust online, including a third party validation entity and a trust symbol, wherein the trust symbol is configured to display security and assurance information. In this system, the validation entity validates the security and assurance information to be displayed by the trust symbol.

Another method for establishing trust online includes validating information relating to a web page, creating a trust symbol, and providing the trust symbol to an owner or developer of the web page. The trust symbol can be created by developing a trust symbol Java script/HTML code and including the trust information in the trust symbol code.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

The following description includes specific details in order to provide a thorough understanding of the present method of displaying trust online. The skilled artisan will understand, however, that the products and methods described below can be practiced without employing these specific details, or that they can be used for purposes other than those described herein. Indeed, they can be modified and can be used in conjunction with products and techniques known to those of skill in the art in light of the present disclosure.

Figure 1:
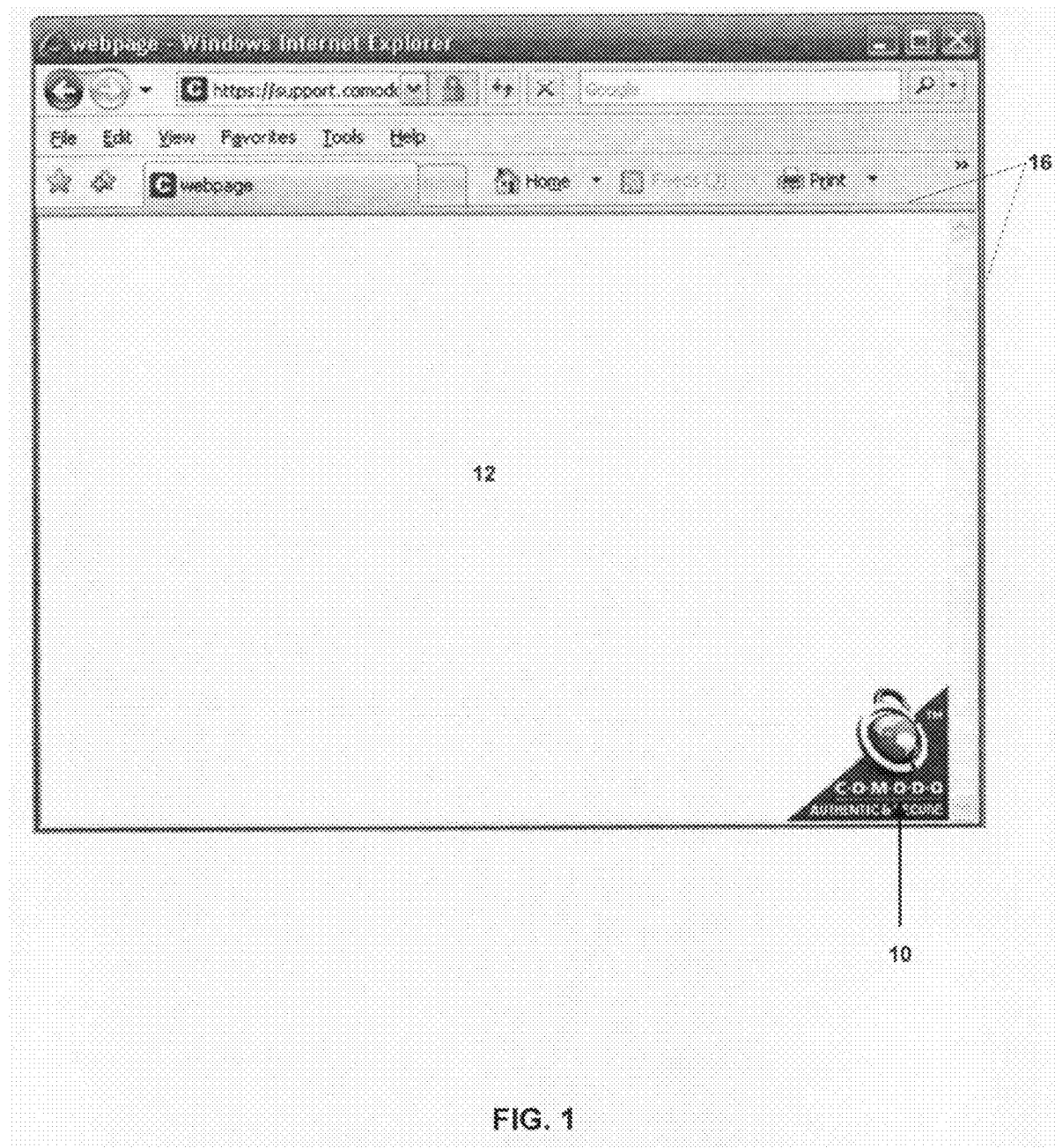
FIG. 1 shows a screenshot of one embodiment of a method for establishing trust online on a blank webpage.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment Referring now to the Figures, FIG. 1 depicts a method of displaying trust on an online website. The method comprises displaying a trust symbol (10) on the website (12), the trust symbol being configured to provide security and assurnace related information, or any other type of information deemed relevant to establishing trust of the website (12) or website provider.

The trust symbol (10) is generally displayed in a conspicuous location on the website, alerting a user to the presence of the trust graphic. In one embodiment, as shown in the figure, the conspicuous location is any one of the four corners of the website (12) within the browser viewing window (16). In another embodiment (not shown), the trust symbol (10) is located along one of the sides of the browser viewing window (16).

The trust symbol (10) can be any shape, size or design sufficient to capture a user's attention without obstructing view of any of the web page content. In one embodiment, as shown in FIG. 1, the trust symbol (10) is a triangle that fits into the corner (14) of the website (12). In another embodiment, the trust symbol (10) may be a square, circle, or any other animated graphic. Colorful and animated graphics help to draw a user's attention to the trust symbol (10).

Figure 1B:
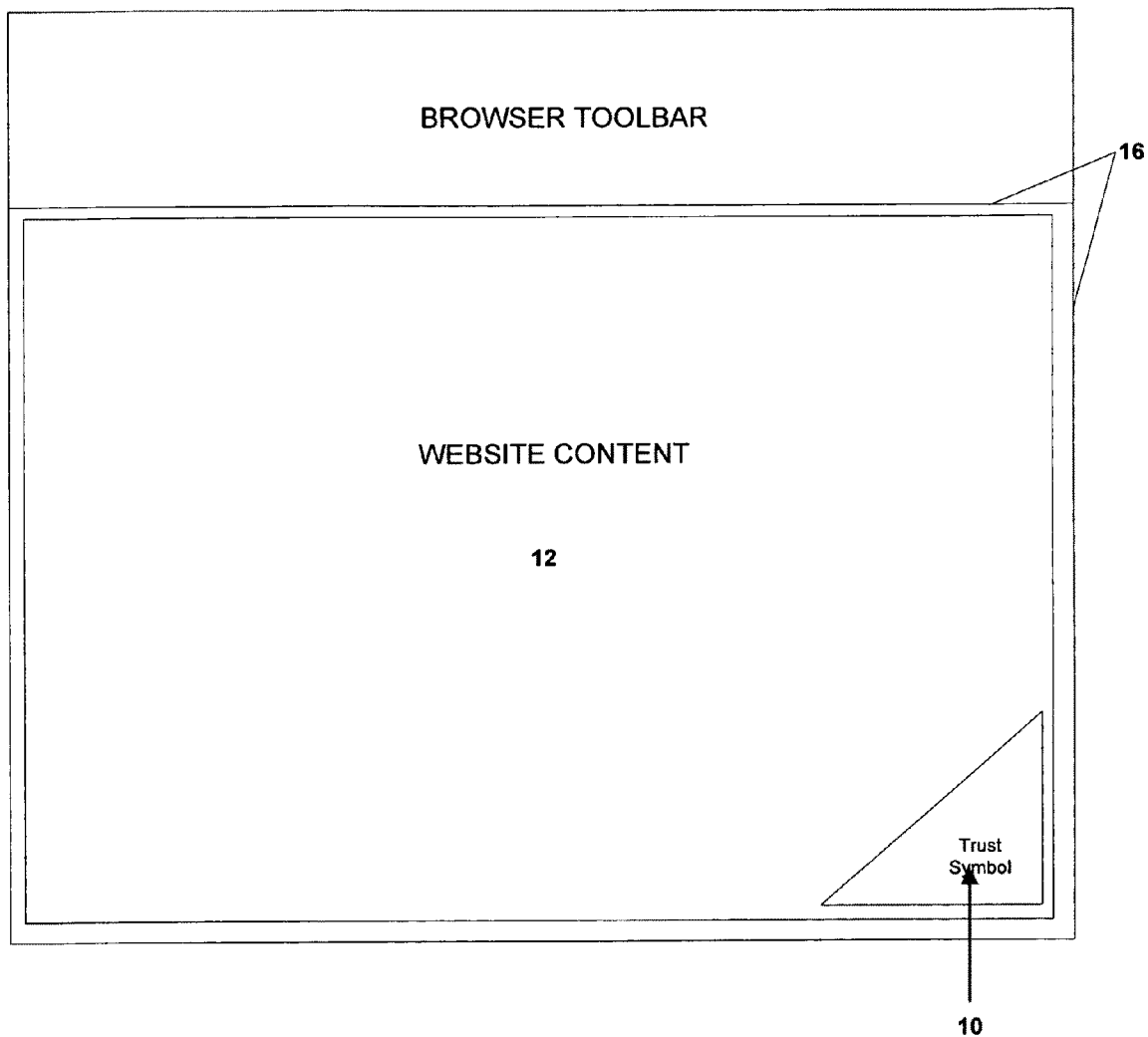
FIG. 1b shows a screenshot of the use of the trust symbol on a website
Figure 1C:
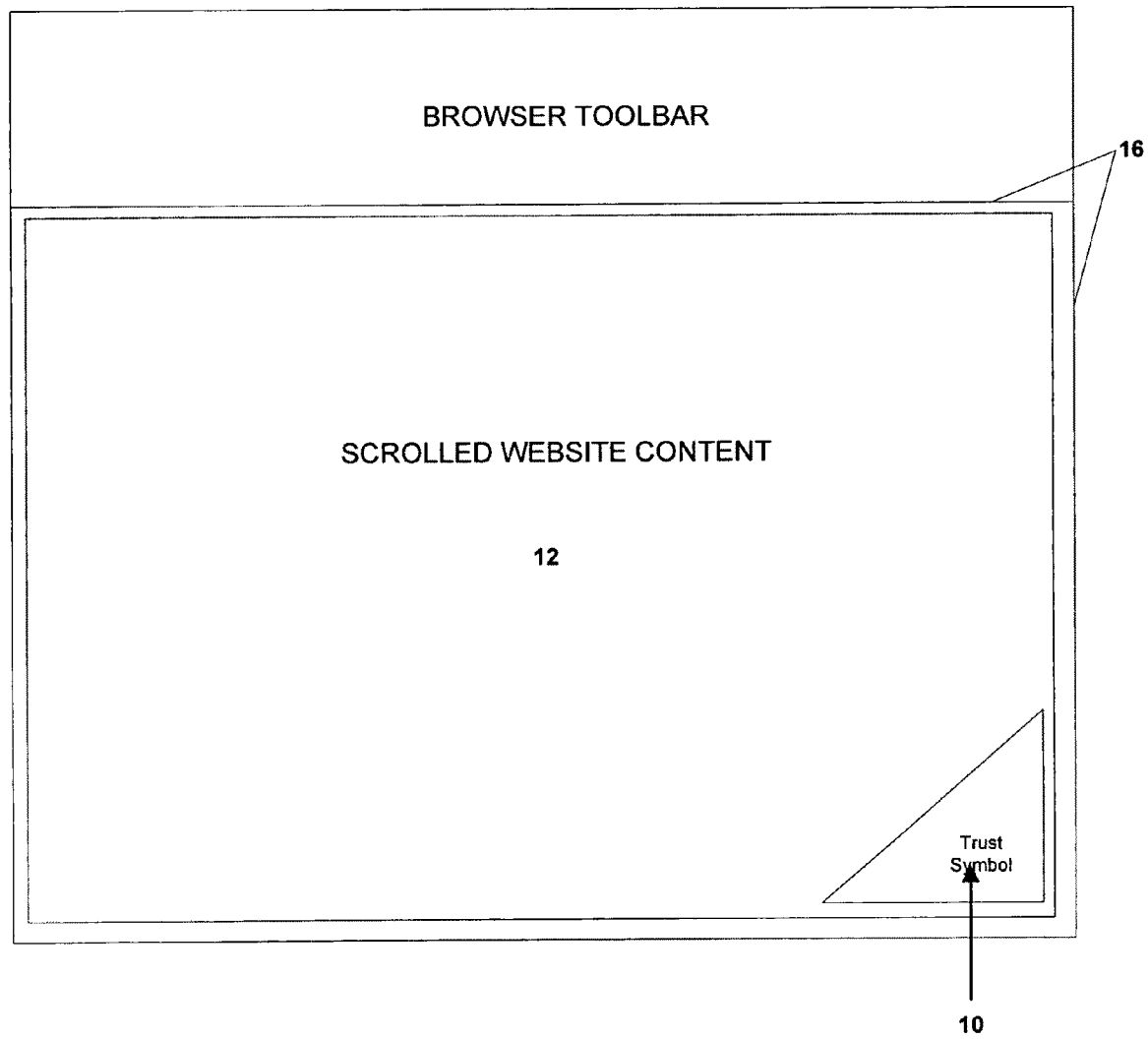
FIG. 1c shows FIG. 1b scrolled down and to the left, showing the static nature of the trust symbol.

In one embodiment, as shown in FIG. 1b and 1c, the trust symbol (10) is configured to remain static in the same location relative to the browser viewing window (16), even when the web page (12) is scrolled down or to the side. Thus, a user will always be able to see and access the trust symbol (10), regardless of the location of the web page's content (12) displayed in the browser viewing window (16).

By displaying the trust symbol (10) in a corner of the website (12) or along a side of the browsing window (16), it is much easier for a user to see and identify the trust symbol (10) than it is to identify conventional security icons, such as a padlock on the browser toolbar, or a site seal. A site seal may only be visible if a user scrolls down to the bottom of the web page, whereas the trust symbol (10) is always visible, regardless of scrolling the web page.

The trust symbol (10) is also configured to display security and assurance information. In one embodiment, shown in FIG. 2, the trust symbol (10) displays this information when a user double-clicks on the trust symbol (10). In another embodiment, the information is displayed when a user mouses-over the symbol (10), leaving the mouse pointer (18) over the symbol (10). In another embodiment, the trust symbol (10) itself displays the information without any action required by a user. Indeed, any method known to those of skill in the art could be used to trigger the display of the security or assurance information.

Figure 2:
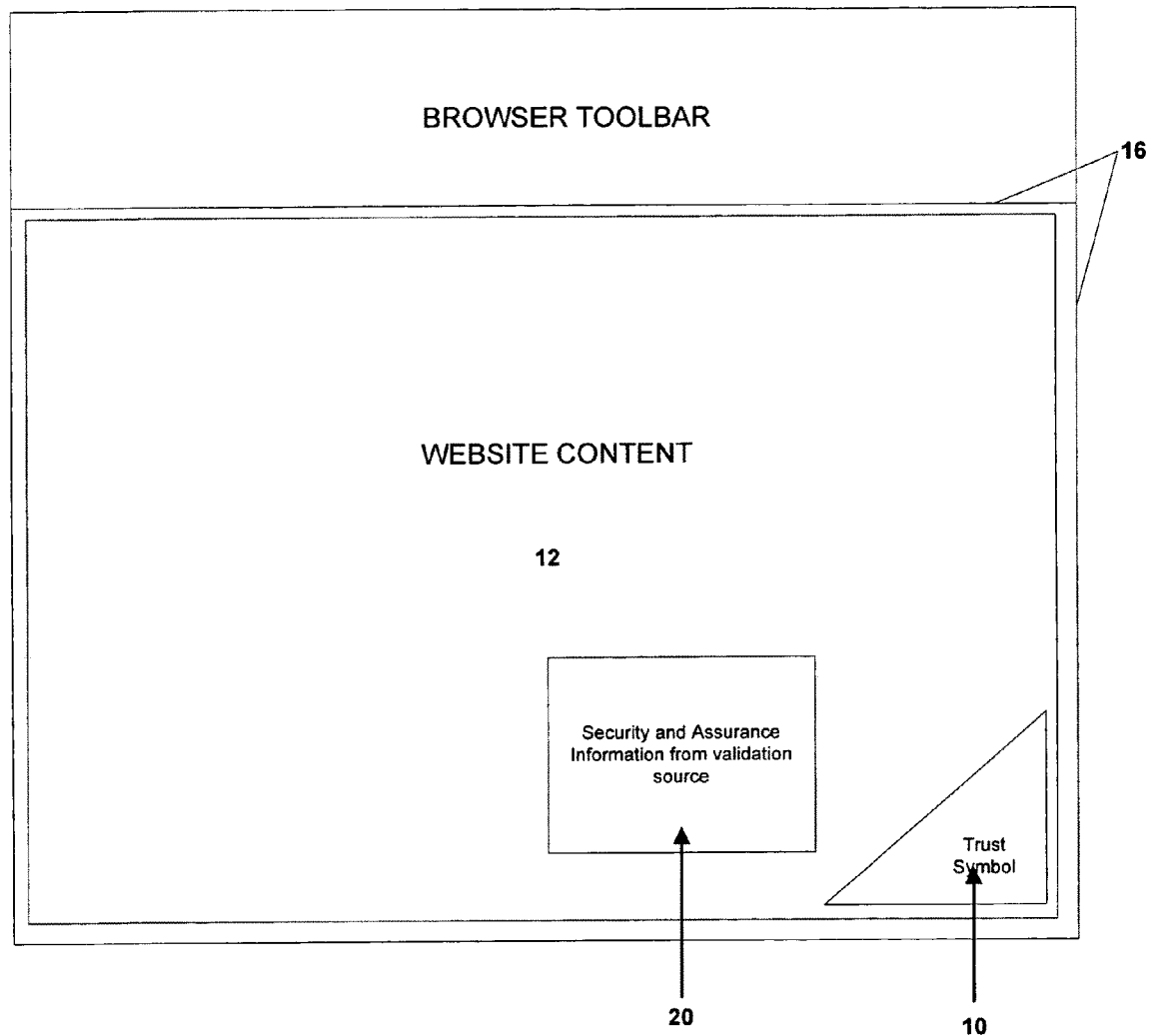
FIG. 2 shows a screenshot of an embodiment of a method of displaying trust information.

In one embodiment, as shown in FIG. 2, the security and assurance information are displayed in a pop-up graphic (20) next to the trust symbol (10). In another embodiment (not shown), the information is displayed on a separate web page within in a new browser window.

The information displayed by or connected with the trust symbol (10) is typically security and/or assurance information relating to the website (12), but it may also be any other type of relevant information desired by the web page owner. Examples of the information provided by the trust symbol (10) include security, authentication, integrity, and business information. In one embodiment, the information may state that the website (12) or web page is secured by SSL. In another embodiment, it may provide that the web server operating the website is regularly checked for security vulnerabilities. In yet another embodiment, it may display information relating to the authentication of the web page or web site (12), or who is authorized to operate the domain of such, or which entity has registered for the trust symbol (10) and is operating the website (12). In another embodiment, the information may describe relevant business information, such as noting that the website (12) or operator of the website (12) has been authorized or validated by a third party to securely accept and process credit card transactions. Indeed, any information may be disclosed by the trust symbol (10) that assists a user to gain trust in the security of the web page or website (12) associated with the trust symbol (10).

Figure 3:
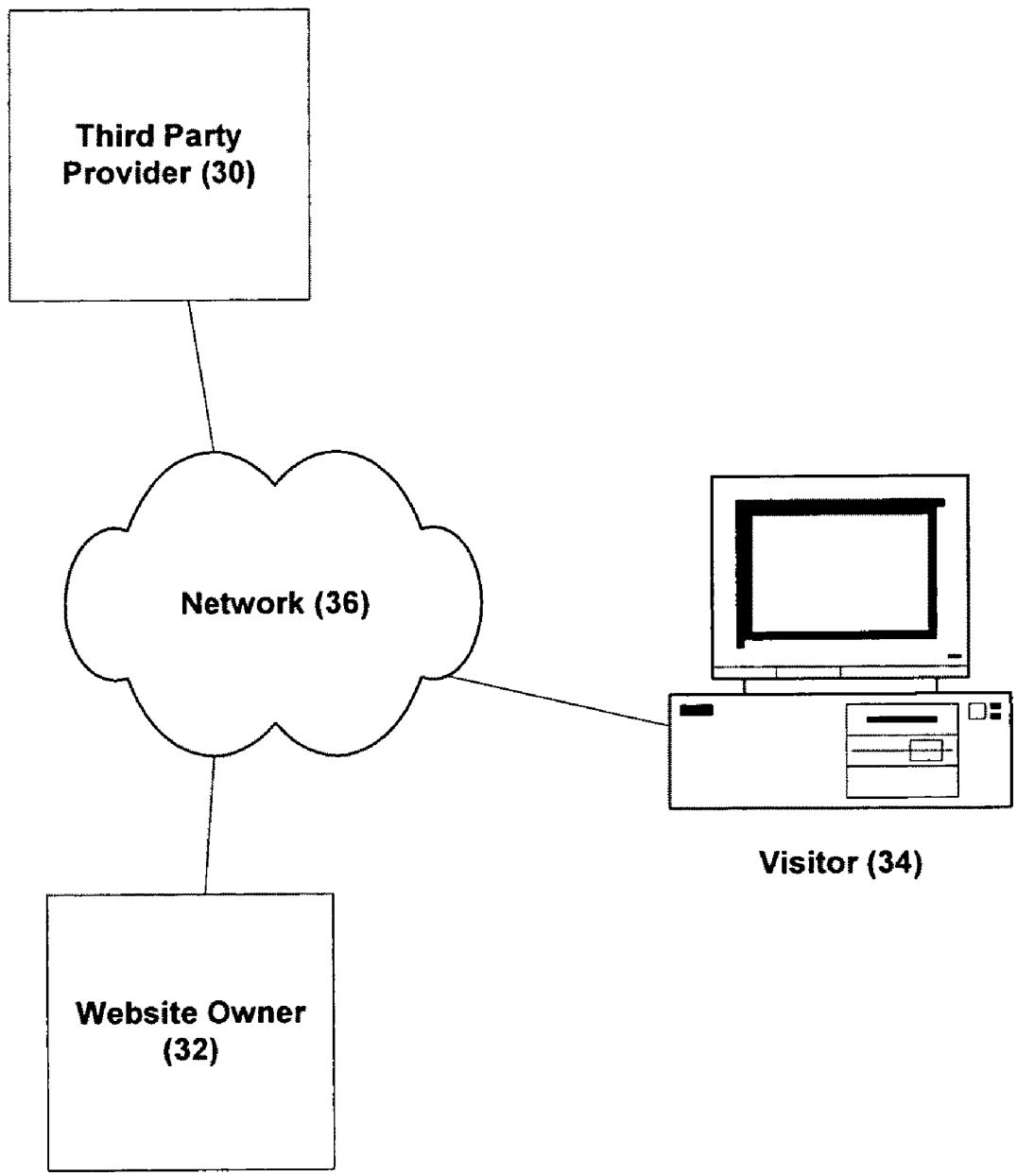
FIG. 3 depicts a system for establishing trust.

The information provided by the trust symbol is typically validated by a reliable third party, as shown in FIG. 3. In FIG. 3, an exemplary system for establishing trust online includes a reliable third party provider (30) of a trust symbol (10) and a website owner (32) connected via a network (36). The network (36) may be a local are network, but is typically a larger network, such as the Internet. The system also includes a trust symbol code owned by the third party provider (30). Visitors (34) to the website owner's website may access the website via the network (36).

The trust symbol is typically created by the third party provider (30) as a Java script/HTML code that can be copied into a website's HTML code. The trust symbol is usually owned and protected by the third party provider (30). The trust symbol code can be protected by any means known to those of skill in the art, such as by encryption, or by an applet. A website owner (32) obtains the trust symbol code from the third party provider (30) after the website owner (32) complies with the business and validation procedures required by the third party (30). Typically, these validation procedures are directly related to the information displayed by the trust symbol. In one embodiment, the validation procedures include those commonly used for validation of SSL digital certificates. In another embodiment, the validation procedures include periodic scans for vulnerabilities in the website's web server. Once a website owner (32) has complied with all validation procedures required by the third party provider (30), the third party provider (30) then securely transfers a copy of the trust symbol code to the website owner (32). The website owner (32) can then paste the trust symbol code into the website's HTML code, thus making the trust symbol available to be viewed from an Internet browser by visitors (34) to the website.

By allowing a website owner to copy the trust symbol code into the website's HTML code, the website owner has the control over the display of security and assurance information, as opposed to the web browser retaining control over the display of the padlock symbol. This method allows the information to be customized according to the needs and designs of the website owner. This also allows the information to be tailored to the website's audience, thus allowing for greater readability and understanding for specific users.

The preceding description has been presented only to illustrate and describe embodiments of the method for establishing trust online. It is not intended to be exhaustive or to limit the method to any precise form disclosed. Many modifications and variations are possible in light of the above teaching.

What is claimed is:

1. A method for continuously displaying the trusted status of a website to a computer user, comprising:

displaying a trust symbol provided by a third party validator as an integrated part of the website in a location set by the operator of the website such that the trust symbol is always visible on the website at a location that is static relative to the browser viewing window, displaying security or assurance information from the third party validator about the website in response to the user interacting with the trust symbol, and keeping the security or assurance information and trust symbol visibly displayed on the website in the static location relative to a browser viewing window regardless of webpage scrolling.

2. The method of claim 1, wherein the static location of the trust symbol is a corner of the browser.

3. The method of claim 1, wherein the security or assurance information is: (i) displayed after the computer user interacts with the trust symbol and (ii) customized for the website's audience.

4. A method according to claim 1 where the trust symbol is a logo fixed across the bottom of the website displaying the trust symbol.

5. The method of claim 1, wherein the static location of the trust symbol is on the side of the browser viewing window.

6. The method of claim 1, wherein the trust symbol location is set by having the operator copy code provided by the third party validator into the website's HTML code.

7. The method of claim 1, wherein the interaction with the trust symbol is having the computer user perform a mouse over event.

8. A system for displaying the trusted status of a website to a computer user comprising:

a. a computer with browser software running,
  b. a website displayed in a viewing window of the browser,
  c. a third party validation entity providing security or assurance information about the website,
  d. a trust symbol provided by a third party validator that is displayed as part of the website in a location set by a website operator and where the location is a static location relative to the browser viewing window,
  e. means for displaying the validated security and assurance information after the user interacts with the trust symbol,
  f. means for displaying the trust symbol and security or assurance information so that the trust symbol and security or assurance information do not change positions relative to the edges of the browser viewing window when the website is scrolled.

9. A method for displaying trust information associated with a website being viewed by a computer user, comprising:

a. validating information relating to the website;
  b. creating a trust symbol based on the validation of information relating to the website using Javascript/HTML code;
  c. incorporating the validation information in the Javascript/HTML code;
  d. providing the Javascript/HTML code to a website operator;
  e. displaying the trust symbol on the website in a location specified by the website operator where the location is static relative to the browser viewing window;
  f. displaying security or assurance information about the website in response to the user's interaction with the trust symbol, and
  g. having the trust symbol displayed as part of the website by the website operator in a manner such that the trust symbol remains static relative to the browser viewing window when the website scrolls.

10. The method of claim 9, wherein the static location of the trust symbol is a location the corner of the browser.

* * * * *